United States Patent [19]

Tow

[11] Patent Number: 5,761,654
[45] Date of Patent: Jun. 2, 1998

[54] MEMORY STRUCTURE AND METHOD FOR TUNING A DATABASE STATEMENT USING A JOIN-TREE DATA STRUCTURE REPRESENTATION, INCLUDING SELECTIVITY FACTORS, OF A MASTER TABLE AND DETAIL TABLE

[75] Inventor: Daniel S. Tow, Palo Alto, Calif.

[73] Assignee: Oracle Corporation, Redwood Shores, Calif.

[21] Appl. No.: 659,158

[22] Filed: Jun. 5, 1996

[51] Int. Cl.$^6$ .................................................. G06F 17/30
[52] U.S. Cl. ........................ 707/2; 707/3; 707/4; 707/101
[58] Field of Search ........................... 395/602, 603, 395/604, 611; 707/2, 3, 4, 101

[56] References Cited

U.S. PATENT DOCUMENTS

| | | | |
|---|---|---|---|
| 5,276,870 | 1/1994 | Shan et al. | 395/600 |
| 5,495,605 | 2/1996 | Cadot | 395/600 |
| 5,546,570 | 8/1996 | McPherson, Jr. et al. | 395/600 |
| 5,546,571 | 8/1996 | Shan et al. | 395/600 |
| 5,546,576 | 8/1996 | Cochrane et al. | 395/600 |
| 5,548,755 | 8/1996 | Leung et al. | 395/600 |
| 5,574,900 | 11/1996 | Huang et al. | 395/601 |
| 5,598,559 | 1/1997 | Chaudhuri | 395/602 |
| 5,608,904 | 3/1997 | Chaudhuri et al. | 395/602 |
| 5,619,692 | 4/1997 | Malkemus et al. | 395/602 |
| 5,625,813 | 4/1997 | Venn | 395/602 |
| 5,630,120 | 5/1997 | Vachey | 395/602 |

OTHER PUBLICATIONS

Advertisement: "Operation SQL> Storm," Oracle Integrator, May/Jun. 1995; vol. 7, No. 3, p. 36.

*Primary Examiner*—Thomas G. Black
*Assistant Examiner*—Jean R. Homere
*Attorney, Agent, or Firm*—Arnold, White & Durkee

[57] ABSTRACT

A method of constructing an aid to tuning of database statements comprises a data structure (stored in a memory on a computer system) which compactly represents that information which is needed about a database statement to determine the optimal series of operations (e.g., table data fetches) needed to execute the statement. The information includes the relationships between tables joined in the statement and the selectivities of logical conditions applied to rows in those tables.

15 Claims, 5 Drawing Sheets

110

| CUSTOMER NUMBER | CUSTOMER NAME | CUSTOMER PHONE NUMBER | SALES REP |
|---|---|---|---|
| 2030002 | O'RIELLY, CHARLES | 214 696 0099 | 1997 |
| 2030003 | BARKER, MARIANNE | 817 267 1177 | 2020 |
| 2030004 | CARI, JANET | 202 893 8822 | 1846 |
| 2030005 | FRAIZER, RODNEY | 512 794 8111 | 1997 |
| 2030006 | WELDON, NANCY | 808 411 9753 | 1997 |
| 2030007 | RHEA, RICK | 512 794 0123 | 1846 |
| 2030008 | LESTER, SHERRY | 717 966 5432 | 2020 |
| 2030009 | HARRY, DEBRA | 608 296 2090 | 1997 |

114　　115　　116　　117

160

| SALES REP | REP NAME | REP PHONE NUMBER |
|---|---|---|
| 1846 | TURNER, DOT | 214 999 3005 |
| 2020 | EARP, WYATT | 214 999 3010 |
| 1997 | FULTON, SUZY | 214 999 2829 |
| 0573 | ARNOLD, TOM | 214 999 2526 |
| . | . | . |
| . | . | . |
| . | . | . |

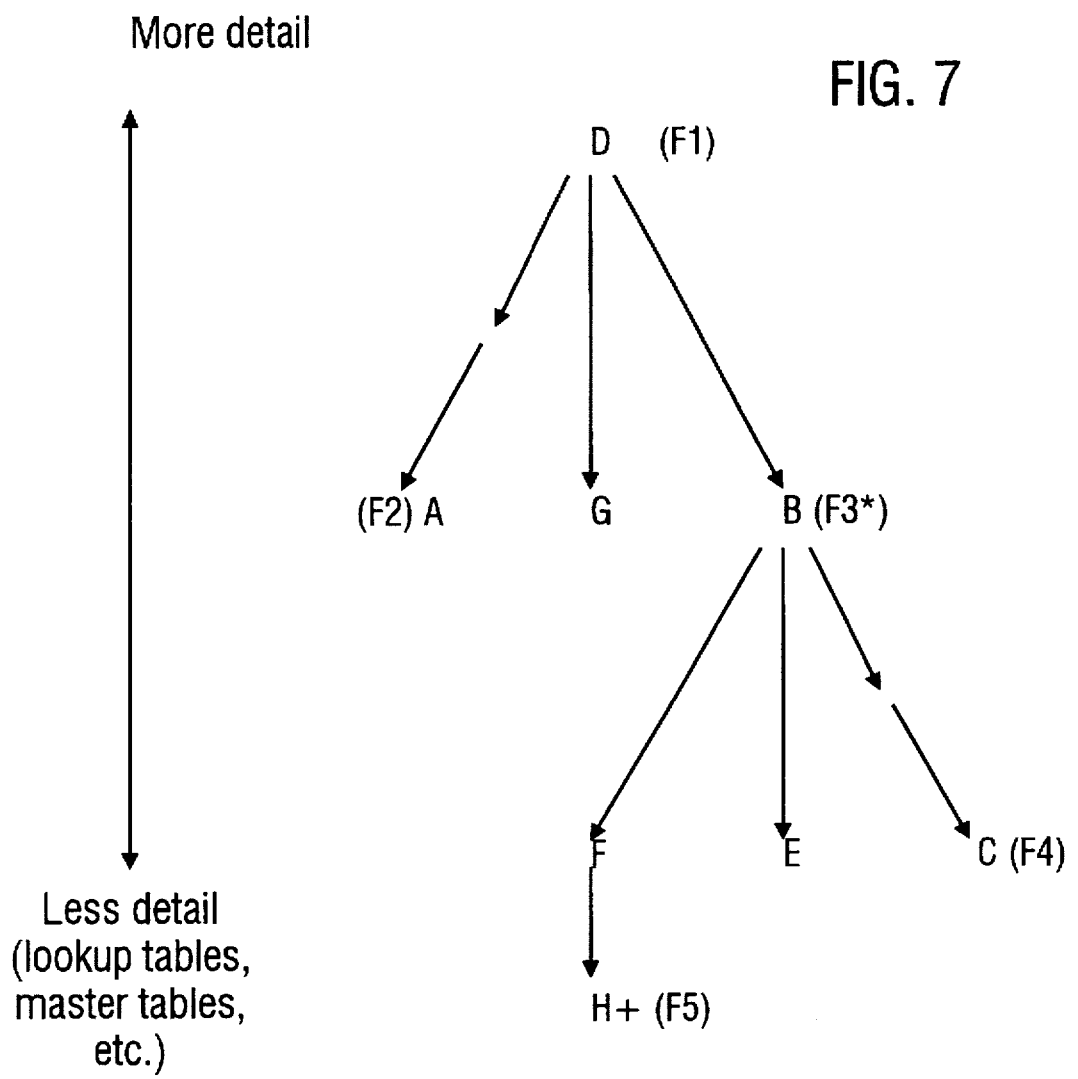

MEMORY STRUCTURE AND METHOD FOR TUNING A DATABASE STATEMENT USING A JOIN-TREE DATA STRUCTURE REPRESENTATION, INCLUDING SELECTIVITY FACTORS, OF A MASTER TABLE AND DETAIL TABLE

BACKGROUND OF THE INVENTION

The invention relates in part to a method of reorganizing ("tuning") a Structured Query Language (SQL) statement (sometimes referred to as a query) to make the execution of the statement by a computer more efficient.

Databases in Computer Systems

FIG. 1A is a greatly simplified representation of a computer system 100 that includes a data store 105, a database manager 106, and a communications manager 107 used to communicate with a user terminal 108.

The data store 105 commonly takes the form of one or more memory devices (so-called random access memory, i.e., RAM) in combination with, e.g., one or more so-called hard disks, optical disks, magnetic tapes, and flash memory devices, among others.

As discussed in more detail below, the data store 105 is used to store information in the form of data tables.

Physically, the database manager 106 and the communications manager 107 are usually implemented by running suitable computer programs (often referred to colloquially as "software") on a general-purpose programmable central processing unit (not shown).

The software used to implement the database manager 106 may be any of a wide variety of database management system (DBMS) programs. Some well-known examples of DBMS programs currently on the market include Oracle Corporation's ORACLE 7 software, IBM's DB2 software, and Microsoft Corporation's ACCESS software, among others.

The software used to implement the communications manager 107 may be any of a wide variety of operating-system or communications-management programs. Some well-known examples include the MS-DOS operating system, possibly with the Windows user interface; the UNIX operating system software; and IBM's MVS operating system, possibly with the VTAM communications management software, among others.

The computer system 100 is likely to run one or more other computer programs that can perform work for users. Two such programs are illustrated in FIG. 1A as Application Programs 1 and 2. An application program may take the form of, e.g., an airline reservation system, an inventory management system for a chain of auto parts stores, and so forth.

As is well known to those of ordinary skill, many computer systems are capable of executing multiple application programs essentially concurrently on a time-shared basis. In computer systems using multi-processing operating systems, different application programs may be executed in different processes, or multiple instances of the same application program may be executed in different processes.

Application Programs 1 and 2 are designed to exchange requests and information with the database manager 106 so that the database manager can do useful work on behalf of either or both of the programs. The arrows respectively connecting Application Programs 1 and 2 and the database manager 106 illustrate the way in which requests and information might flow.

For example, to be able to process a command from a user at the terminal 108 (received via the communications manager 107), Application Program 1 may need to read information from the data store 105. As shown by the arrows in FIG. 1A, Application Program 1 sends a request for the needed information to the database manager 106. The database manager 106 receives the request; reads the requested information from the data store 105; and passes the information back to Application Program 1 (possibly after doing intermediate information processing of its own). Application Program 1 can then respond to the user at terminal 108 via the communications manager 107.

Tables in Databases

Databases very often take the form of tables of information. A table is composed of intersecting rows and columns. Depicted in FIG. 1B is an example of a hypothetical database containing a table 110 with information about a fictional company's sales representatives and customer base. The table 110 is comprised of four columns 114–117. The CUSTOMER NUMBER column 114 contains customer identification numbers; other columns 115, 116, and 117 contain customer names, phone numbers and sales representative identification numbers.

Additional general information concerning database tables can be found in a wide variety of publications, e.g., Rob & Coronel, DATABASE SYSTEMS: DESIGN, IMPLEMENTATION AND MANAGEMENT (Boyd & Fraser 1995); O'Neil, DATABASE: PRINCIPLES, PROGRAMMING, PERFORMANCE (Morgan Kaufmann 1994).

Join Statements

In the context of this application, an SQL statement is an instruction to perform an operation on a set of data. An SQL statement typically comprises one or more conditions used to identify which specific data records in an SQL-compliant database are to be accessed. Those of ordinary skill in the computer science-related arts will recognize, of course, that an SQL statement is both a physical and a logical construct. Physically, an SQL statement is a set of electrical signals that are transmitted, e.g., on a computer network, or that is stored in a memory, e.g., read-write random-access memory (RAM), a disk, etc. Logically, an SQL statement represents an operation to be performed on a specific set or sets of data.

Typically a user, either human or machine, sends an SQL statement to a database management program with SQL search capabilities, such as Oracle7 (™), distributed by the assignee of this application, and other programs well known to those of ordinary skill. Such a program is referred to for convenience as a "search program." The search program interprets the SQL statement and combs through the database in search of information satisfying the statement. In the hypothetical database above, for example, a user might want to query the database to create a list of customers serviced by a particular sales representative.

Such a query will commonly be formulated as a particular type of SQL statement referred to as a "join statement." In nontechnical terms, a join statement is in essence an SQL statement that, when interpreted by the database search program, causes the search program to search through two or more tables in the database to find the set of database records, if any, that satisfies the SQL statement. Consider the following example:

select <information requested> from

TABLE_A A,

TABLE_B B where A.fkey=B.pkey and A.effective_date between :lodate and :hidate and B.phase=1

Here, "A.fkey" represents a non-uniquely-indexed foreign key (in table_A) pointing at the primary key for table_B.

i.e., "B.pkey". If the key is multi-column, there would be several of these equality conditions, of course.

Significance of Processing Order

Two of the conditions in the above SQL statement are "filter" conditions on A and B respectively. These filter conditions are:

and A.effective_date between :lodate and :hidate and B.phase=1

Filter conditions are non-join conditions, which usually can be evaluated by looking at just a single table's columns. Rows that do not satisfy filter conditions are discarded as soon as the filter condition is evaluated, avoiding any further work on the rows, e.g., avoiding joining them to other tables later in the execution plan. Thus, as a general rule, it would be advantageous to evaluate non-join conditions first.

It will be apparent to those of ordinary skill that, depending on the number "n" of tables being joined, there are n! (i.e., n factorial) possible join orders. As shown by the discussion above, the order in which the specific conditions are evaluated by the database search program can make a significant difference in the time required to execute the statement. Many database search programs have automatic optimizers, e.g., rule-based or cost-based optimizers that attempt to determine the optimum order of execution of operations needed to carry out an SQL query. These optimizers, however, often do not produce truly optimized statements.

SUMMARY OF THE INVENTION

In one illustrative embodiment, the invention relates to a method of creating a data structure in a computer memory that encodes information about an SQL statement. The information, which can be displayed graphically as a "query diagram," is arranged in a specific logical structure. The data structure serves, in essence, as a "map" of the SQL statement.

The query-diagram data structure can be used in tuning of the SQL statement so that when the statement is parsed and executed by a database search program, filter conditions in the statement are executed at the earliest practicable opportunity. That can dramatically reduce the time needed by the search program to complete its execution of the SQL statement.

The query-diagram data structure, sometimes referred to as a "join tree," comprises a representation of nodes, each representing a table in a database, and directional links, each link representing a master-detail relationship between two linked tables. Also included in the data structure is a representation of a set of properties of the nodes and links. Those properties include:

(1) for each node, a set of zero or more selectivity factors. Each selectivity factor indicates the expected fraction of rows in the table represented by the node that satisfy one or more logical conditions set forth in the data access statement, e.g., filters;

(2) for each directional link associated with a detail table and a master table, (i) the expected number of rows in the detail table that satisfy an average row in the master table, and (ii) the probability that a row in the detail table will have a corresponding row in the master table.

Generally speaking, the process of utilizing the query-diagram data structure to tune the query comprises:

(a) selecting a node in the query-diagram data structure, representing a table with the "best" filter (and thus the best potential initial screening of rows in the database), referred to as the "driving" table, as indicating the first data fetches that should be executed by the database search program;

(b) then "driving" through the data structure in an organized manner to determine an order in which the other SQL statements should be executed.

BRIEF DESCRIPTION OF THE DRAWINGS

FIG. 1B is a block diagram of a simple hypothetical database to illustrate some basic concepts.

FIGS. 3 through 7 are query diagrams for hypothetical queries.

DETAILED DESCRIPTION OF ILLUSTRATIVE EMBODIMENTS

Figure 1A:
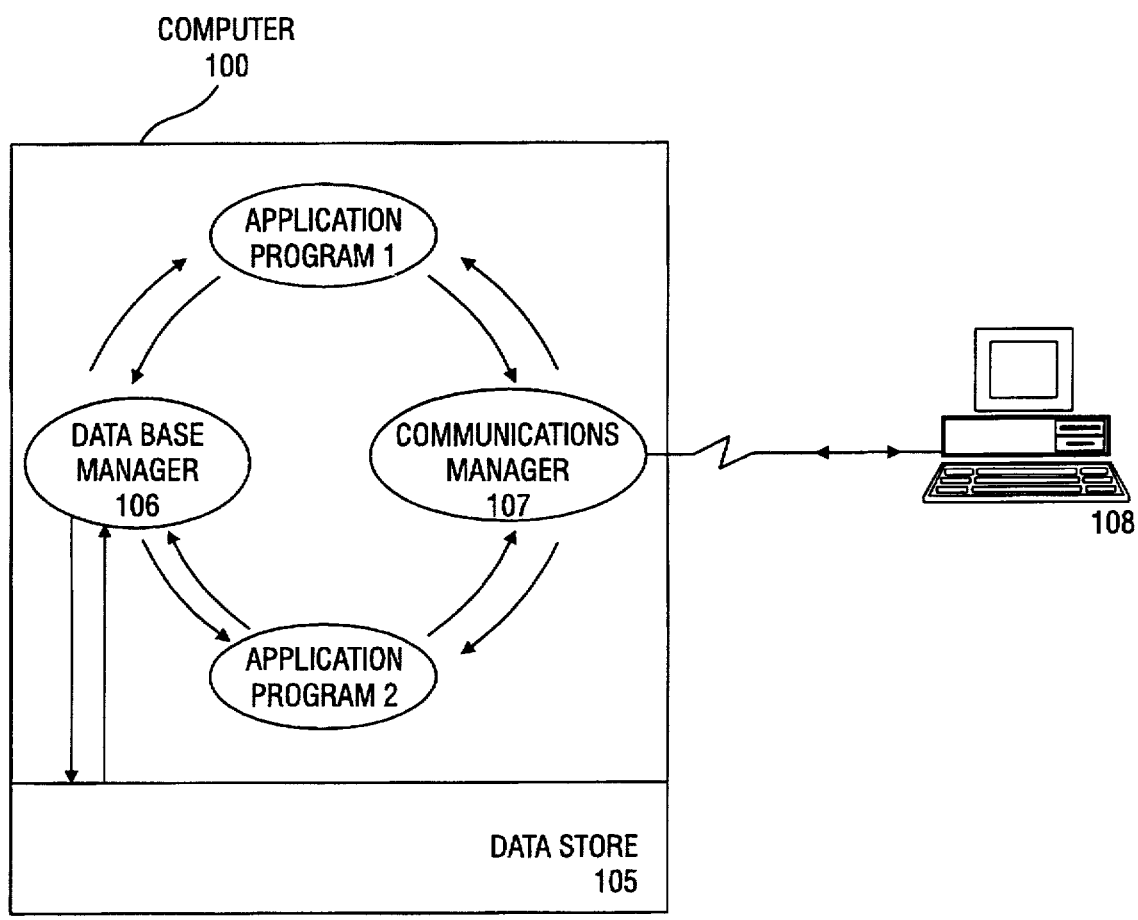
FIG. 1A is a dataflow block diagram of a typical computer system.

An illustrative embodiment of a method in accordance with the invention is described below. In the interest of clarity, not all features of actual implementations are necessarily described in this specification. It will of course be appreciated that in the development of any such actual implementation, as in any such project, numerous programming decisions must be made to achieve the developers' specific goals and subgoals (e.g., compliance with system- and business-related constraints), which will vary from one implementation to another. Moreover, attention must of course be paid to proper programming practices for the environment in question. It will be appreciated that such a development effort might be complex and time-consuming, but would nevertheless be a routine undertaking for those of ordinary skill having the benefit of this disclosure.

Illustrative Method of Creating a Data Structure

In a broad sense, an illustrative method in accordance with the invention is performed by a computer executing a program of instructions. The method entails creating a data structure for use in selecting an execution plan for a data access statement. Examples of data access statements include statements such as SELECT statements in the well-known Structured Query Language (SQL). The method, however, is language-independent and can be used in connection with other data-access languages.

The data access statement in question specifies (i) a plurality of tables and (ii) a plurality of join conditions. Each of the join conditions specifies a relationship between a table that uses a key as a primary key, referred to as a master table, and a table that uses a corresponding key as a foreign key, referred to as a detail table.

As is well-known in the art, a primary key for a given table is a key that can take on a variety of values, but each individual value appears no more than once in that table. For example, in table 110 of FIG. 1B, the primary key for that table is the CUSTNUM key in column 114, because no two customers can have the same customer number.

A foreign key is a value that exists in a table and which references a primary key, usually in another table. For example, in table 110 of FIG. 1B, each customer's SALESREP value references a particular row in table 160 whose primary key is equal to that SALESREP value. That means that the SALESREP key is a foreign key in the customer table 110. A particular sales representative may represent more than one customer, which means that his or her SALESREP number may appear in more than one row of the customer table 110. In table 110, two customers, Barker and Lester, have CUSTNUM values 2030003 and 2030008 respectively. Their respective rows in table 110 include references to the same SALESREP value 2020. That value in the sales representative table corresponds to sales representative Earp. In the sales representative table 160, however, a given SALESREP number appears no more than once, because no two sales representatives have the same number.

Thus, in the context of the foregoing illustration, table 160 is a master table with respect to table 110, which in turn is a detail table with respect to table 160.

In the illustrative method, a set of nodes respectively representing the tables is defined, along with a set of directional links between pairs of nodes. Each directional link represents a master-detail relationship between a detail table and a corresponding master table. The specific directionality of the directional link is not crucial. In one embodiment, links may be defined as running from detail tables to corresponding master tables. For example, in FIG. 2, a link is depicted by an arrow running from detail table A to a master table B. If desired, of course, the links may run in the other direction, as long as consistent notation is maintained.

Figure 2:
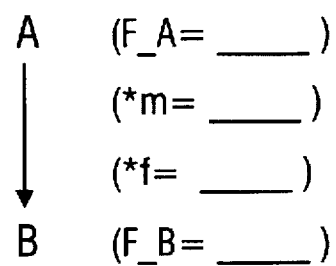
FIG. 2 illustrates the notational convention of a query diagram used in generating a tuned query.

In a memory device, a data structure, referred to as a join tree, is defined. The memory device may take the form of read-write memory (RAM), disk storage, or the like. The data structure comprises a representation of the nodes and their directional links. The logical structure may be depicted graphically as a directed graph such as shown in FIG. 2, which shows a directional link between two nodes A and B. Other directed graphs of the same nature are shown in FIGS. 3 through 7. In a computer implementation, the logical structure is likely to be represented in any of a variety of different ways, e.g., as a matrix.

A representation of a set of properties of the nodes and links is associated with the join tree. The representation comprises (1) for each node, a set of zero or more selectivity factors; and (2) for each directional link associated with a detail table and a master table, (i) the expected number of rows in the detail table that satisfy an average row in the master table, and (ii) the probability that a row in the detail table will have a corresponding row in the master table.

Each selectivity factor indicates the expected fraction of rows in the table represented by the node that satisfy one or more logical conditions set forth in the data access statement. The selectivity factors (sometimes referred to for convenience as filters F) may be expressed as a fraction less than or equal to 1. In FIG. 2, the filters are shown as F_A and F_B, i.e., the filters to be applied to tables A and B respectively. Each selectivity factor represents the proportion or fraction of rows in a table that is expected to satisfy a logical condition in the data access statement. For example, an SQL SELECT statement may take the form of:

SELECT EmployeeName from Emp where Salary>100,000. In that statement the condition "Salary>100000" is a logical condition that filters rows from the Emp (Employee) table. Depending on the salary values represented in the table Emp, the selectivity factor F for that table may be comparatively high, e.g., 0.9, or comparatively low, e.g., 0.001. The selectivity factor F may be determined in Oracle SQL using the statement:

select sum(decode(sign(sal−100000), 1, 1, 0))/count(*) from emp or using similar statements in other SQL dialects.

Once constructed, the join tree may be displayed graphically if desired, e.g., on a computer display screen or in a printout, to aid a human user in manual tuning of the data access statement. The join tree may also be used in an automatic method as described below.

Use of the Data Structure for Query Tuning

The method described above provides a tool which can permit a database system programmer to "tune" an SQL query to achieve significant improvements in execution speed. This can be especially useful when the SQL statements in question are executed repeatedly (e.g., "canned" SQL statements that are executed for periodic reports). Generally speaking, and as discussed in more detail below, tuning in accordance with this approach is done by:

(1) "diagramming" the query by creating a data-structure representation of the join statement using the method described above;

(2) selecting one of the tables specified in the join statement for filtering as the first table data fetch to be executed, and (3) "driving" through the query-diagram data structure, automatically or semiautomatically, beginning with the selected table and thereafter traversing through the data structure in an organized manner, to determine an appropriate order in which the remainder of the join statement should be executed.

Preliminary Work: Standardized Query Formatting

When tuning an SQL statement, it can be useful to format the SQL statement in a fairly standardized way. In the example above, the keyword "from" is on a line by itself, so that the tables and aliases referenced can be found quickly. Each "table-name alias-name" pair is listed on its own line, making it easy to change the order of tables in the from clause. It is also useful to give each separate condition in the "where" clause its own line (if it will fit) so that join conditions and filters can be quickly identified.

Query Diagramming Theory and Notation

As indicated above, the tuning problem can be addressed by representing the SQL statement as a simple diagram that makes the problem much easier to visualize. The data structure described above is a machine implementation of such a diagram. One such statement is shown in FIG. 2. In one approach to diagramming the SQL statement, the symbol and notation conventions are as follows:

Table aliases (or table names, if the tables are unaliased) are shown as nodes in a graph where joins are represented by links in the graph, with arrows on any side of the join representing a unique lookup, usually meaning an equi-join to a whole uniquely-indexed primary key. If exactly one side of the join points to a primary key (as is usually the case), the arrow points downward, toward the primary key. Next to the alias nodes of the graph, filters on those tables are represented in parentheses. If there were more than one filter on a table, each could be shown separately.

Alongside the arrow, multipliers *m and *f represent how many rows will join using the join condition in either direction. For instance, *m is the average of the number of rows in the detail table A that have foreign-key values that match a given primary-key value in table B. Phrased another way, *m is the ratio of (i) the number of distinct rows satisfying the join statement in detail table A to (ii) the number of distinct rows satisfying the join statement in master table B. If all rows in a detail table A have respective foreign keys matching respective primary keys in master table B, then *m is simply the number of rows in the detail table A divided by the number of rows having matching primary keys in the master table B.

As an example of *m, suppose that in FIG. 1B a simple join statement asks for a join of all rows in customer-number table 110 (a detail table) that have as a foreign-key value a sales-rep number used as a primary-key value in table 160. In this example, all 8 rows of table 110 satisfy the join condition, i.e., all 8 rows have a sales-rep number corresponding to one of the primary-key values used in table 160, and 4 distinct primary-key values from table 160 are used in the detail table 110. Thus, *m is the total number of rows in the detail table 110 (i.e., 8) divided by the total number of rows in master table 160 (i.e., 4), which is 2. If 5 distinct primary-key values from the master table 160 were used as foreign-key values in detail table A, then *m would be 8/5=1.6.

On the other hand, *f is the fraction of the number of rows in detail table A whose respective foreign-key values can also be found as primary-key values in master table B. In other words, *f may be thought of as the probability that a row in the detail table will have a corresponding or matching row in the master table. Since the join to B is through the primary key (guaranteed normally by a unique index), it is known that *f<=1. Usually, referential integrity and a "not null" condition on the foreign key further guarantee that the match from foreign key to primary key is successful, so usually *f=1, exactly. Where referential integrity is expected, the *f=__ condition can be omitted, implying that *f=1 by default.

Furthermore, because there is usually at least one detail row for every master row, it follows that m is usually >1, and A is usually a bigger table than B (in rowcount). In this common case, the arrow "→" represents a many-to-one relationship in an entity relationship diagram. In the less-common case where detail rows may not exist, a (0-many) to-<something> relationship (and m may be <1 if the "0" case is common) exists. In the uncommon case where the foreign key may fail to find a matching primary key (no guarantee of referential integrity between these two tables), a <something>to-(0–1) relationship exists. It will be noted that the values for m and f are fixed properties of the relationship between the tables themselves, not of the query, as long as the query joins the tables through the normal full keys linking those tables.

Normally, at least one arrow can be found on the link between joined tables in a query, because ordinarily direct many-to-many relationships between tables (i.e., relationships without some kind of "combinations" detail table in the middle) are not found in databases. A join such as A.non_unique_key=B.non_unique$_{13}$ key yields all possible combinations having that match. For example, on a given key having 100 rows in A and 90 rows in B for the same key value, the query would fetch 9000 rows, which would contain no more information (just being all possible combinations) than would be obtained if the 100 rows of A and the 90 rows of B were separately fetched. Such mini-Cartesian products are rarely useful and can be a sign of something unusual in the data-base design; when such products are seen, that should raise a warning flag to examine the query or the database design.

The term "Cartesian product" is used here to indicate the result of generating all possible combinations of rows from two rowsets both having more than one row. A full Cartesian product results when two full multi-row tables are queried without any join condition at all linking them through primary or foreign keys.

Sometimes, some independent-looking filter condition can normalize a foreign-key-to-foreign-key join, discarding all but one row that is joined in one direction through the non-unique key, making that a virtual unique key when combined with the filter condition. For example, "deptno" in the classic EMPLOYEE table might be a virtual unique key if combined with a filter condition on a new, made-up column "union role" representing the role, if any, that employee plays in union representation:

and union-role='DEPT-REP' where it can be guaranteed that no department has more than one employee with a role in the union of "department representative."

Exact one-to-one table relationships are rare, since two such tables would usually be combined into a single table with the union of the columns of both tables. On the other hand, one-to-(0–1) relationships are often very sensible. In these cases, where the arrow is linked on both ends of the link between joined tables, it may be important to know which end of the link has f<1, implying an implicit filter in the join itself.

Returning to FIG. 2, hypothetical numbers are now discussed to make the problem more concrete. Suppose that the rowcounts for A and B are ascertained, and that A has three times as many rows as B. Generally, that would make *m=3, unless the detail table A sometimes has details that do not join to the master table B. Further assume referential integrity between these tables, so *m=3 and *f=1.

(The rowcounts may be obtained with "select count(*) from <table>" for each table. Alternatively, the Oracle iq.sql script may be used to see the number of primary-key-index distinct keys (which is the same as the rowcount as of the last time the table or index was analyzed), as long as the table or primary key index has been analyzed since the primary key index was last created. For big tables, iq.sql would run much faster than selecting count(*) from the whole table, which requires a full table scan. In Oracle Applications, the primary key index is named <table_name>_U1 by convention.) The iq.sql script is as follows:

set verify off break on INDEX$_{13}$ NAME skip 1 on distinct_keys

Select oi.name INDEX_NAME, i.distkey distinct_keys, c.name COLUMN_NAME from sys.col$ c, sys.icol$ ic, sys.obj$ oi, sys.ind$ i, sys.obj$ ot where ot.obj#=c.obj# and i.bo#=ot.obj# and ic.col#=c.col# and ic.obj#=oi.obj# and oi.obj#=i.obj# and ot.name=upper ('&&1')

order by oi.name, ic.pos#;

If easy access to real rowcounts were not available, the ratio between A rows and B rows may be estimated from a priori knowledge of what the tables represent. In fact, if the query is part of generic code to run at multiple sites, it is useful to make such an estimate anyway to reduce the chance that the SQL query is being tuned for an abnormal data distribution.

Figure 3:
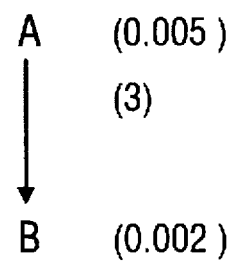

It will be noted that filter selectivities can be measured by running:

select count(*) from X where X-filter-condition and taking the ratio of that rowcount to the total rowcount for the same table. It is often helpful to verify that the resulting selectivity is likely be reasonably typical over time and for other sites. The fraction on the first filter will be dependent on the range input for :lodate and :hidate, so this fraction will be an estimate based on the sort of inputs that a user could normally be expected to give. This can be a serious problem for any automatic optimizer to estimate well. With knowledge of the application, however, it is usually possible to do better than an automatic optimizer in cases of this kind. A low fraction as shown in FIG. 3 likely would mean that a very narrow date range under normal operation is anticipated.

A more complicated case might have multiple filter conditions on a given table. For purposes of choosing an index (or deciding whether a full table scan would be better), it is useful to look at combined filter selectivities for each applicable index, but to show separately filters that apply to different indexes or to no index at all.

"Driving" Through a Query-Diagram Data Structure: A Simple Example

The term "drive" is used here to mean an organized traversal of a query-diagram data structure, starting with the table having the "best" filter, in a manner that results in a "tuned" query.

Proceeding to the filters, assume that "A.effective_date between . . . " is true for 0.5% of A rows, or 0.005*<#_of_rows_in_A> and "B.Phase=1" is true for 0.2% of B rows, or 0.002*<#_of_rows_in_B>. Then, putting in those numbers, the diagram of FIG. 2 becomes that shown in FIG. 3.

As an illustrative example, consider the very simple query diagram of FIG. 3. It is apparent that the most selective filter is that on table B, which is expected to return only 0.2% (0.002) of the rows in table B.

Table B is therefore selected as the table to "drive from," referred to as a driving table. That is, the SQL query is restructured so that the table-B filter will be executed first by the search program. That means that a very high percentage of rows will be elimnated from the join statement at the outset.

The remaining operations in driving through the query diagram comprise:

(a) proceeding from the current table, in this case table B of FIG. 3, to any tables that exist "downhill" (i.e., in the direction of an arrow if the above-described notation convention is used) from the current table. In this example there are no tables downhill of table B; then (b) proceeding to the table "uphill" (i.e., in the direction opposite the arrow) from the current table, which in this case is table A. Table A is accessed next through the index on the join key and the filter condition on table A is executed last in the tuned query;

(c) if any other tables are downhill of the new current table (i.e., table A), then operations (a) and (b) are repeated for each downhill table, beginning with the next-best filter. In effect, a traversal of the query diagram/data structure is made, beginning with the "driving" table and searching downward first, then upward, for the "best" filter at each point in the traversal.

Operations (a) through (c) are repeated until the entire query diagram has been traversed, and thus a complete revised SQL query execution plan has been constructed.

Once a driving table has been selected, the traversal of the data structure/query diagram may be performed automatically by a suitably programmed computer or other machine. The selection of a driving table may require manual intervention as explained in more detail below, or may also be handled automatically by a suitably programmed computer or other machine (e.g., executing an expert-system program of the kind well-known to those of ordinary skill in the computer sciences).

Selecting a Driving Table

For purposes of choosing the driving table for a query, the combined selectivity of all filters on that table together generally is the number to consider foremost. For example, consider the following set of filter conditions on a table X:

and X.datacol between :lodate and :hidate
and X.status='UNFINISHED'
and X.org_id=:org_id Suppose an index exists on (status, datecol) along with a separate index on org_id. Also suppose that the first two filters combined selects 0.1% of the rows of X, while the last filter independently selected 20% of the rows of X. This set of filter conditions would be represented in a diagram as:

x (0.001) (0.2) (TOTAL FILTER: 0.0002)

Here, because it is assumed that the last filter condition is independent of the first two, basic probability theory indicates that the total filter selectivity is simply the product of the two independent filter selectivities, i.e., (0.001*0.2).

It should be noted that filter independence, though common, cannot necessarily be taken for granted. For example, the condition on status might not be independent of the date range if entities designated as "UNFINISHED" are more common among recent entities than among entities as a whole. In such a case, the selectivity of the combined filters cannot normally be determined solely by looking at each filter separately.

Here, selectivities may be used on the individual indexes to choose the best driving index; however, the total filter selectivity would ordinarily be used to choose the driving table in a multi-table join.

Calculating Relative Query Costs

The question arises: What is the desired objective of the optimization? Among the likely items of concern is the load that comes from execution of the SQL statement in question (because that affects the performance of other statements) and the runtime of the statement (because that affects the ease of use of the business process serviced by the statement). Consequently, a weighted average of expected load and runtime would be preferable.

Both runtime and load can be approximated as a weighted average of expected CPU time and the number of physical input/output operations (IOs). These in turn boil down roughly to a weighted average of database blocks accessed (logical IOs, which are a good predictor of CPU costs), weighted according to the expected number of physical IOs per 100 logical IOs for any given object accessed by the access method used.

Index blocks tend to be better cached than table blocks. Consequently, plans accessing a single block at a time spend the most time on table blocks. Likewise, full table scans read many blocks (usually 32) at a time, so the number of physical IOs per block accessed by full table scans is lowered accordingly.

Calculating logical IO for each object accessed is possible, but not usually either convenient or necessary. It can be approximated by simply counting rows accessed for each table, and applying some rough corrections according to (i) how well each table is expected to be cached, and (ii) whether table rows are being obtained by full table scan or by indexed lookup.

Assume that indexes exist for both A.effective_date and B.phase and for both the foreign and primary key involved in the join. Both tables have filters that are selective enough (<=0.5% of rows) that use of a full table scan normally would not be considered (given a choice) if that table were being queried for a single-table fetch (see above). It turns out that the same criteria apply to full table scans for a multi-table join, so it will very likely be desirable to follow a nested-loops join, entering the first ("driving") table through the index on its filter condition.

Cost Calculation Example

For concreteness, assume that table B has 1,000,000 rows, and that the cost of the selected execution plan is simply the sum of the number of rows fetched from each table, with no need to correct for how well cached each table is, or how deep each index is. (It is very rare that such correction alters which plan is best.) All that is needed to compare the two remaining possibilities is now known—enter A through the index on effective_date and drive to B with the index on the primary key, or alternatively, enter B with the index on phase and drive to A with the index on the foreign key. The cost can be calculated as follows:

Driving from table A, that table must contain about 3*1,000,000 rows (because B has 1,000,000 rows and m=3), and the filter on effective_date will result in just (0.005)*(3)*(1,000,000) rows from A. Each of those rows will join to exactly one row from B (through the primary key), so the total number of rows fetched is ((0.005)*(3)*(1,000,000))+((0.005)*(3)*(1,000,000))= 30,000

It should be noted that for finding the cost of this plan, the selectivity of the filter on B is irrelevant, because the filter is only applied after the rows from B are fetched. The index on B.phase should not be used if driving from A—in general, indexes on filter conditions should only be used for driving tables. (The index on B.phase could be used, but normally would not be a good idea. This index could be merged with the unique index on B.pkey, but it is ordinarily much cheaper to simply fetch a row from the table, even if it is a row that is discarded, than it would be to merge the one rowid from B.pkey with the 2000 rowids from A.phase before going to the table. Alternatively, the index on B.phase could be used instead of the index on B.pkey, but that would fetch 2,000 times more rows; more than 1,999 of the 2,000 rows just fetched would then be discarded because they failed to satisfy the join condition.)

The cost of the join, driving from B to A, can now be computed. The indexed filter on B.phase will drive to 0.002*1,000,000=2,000 rows from that table, which will then be joined to three times as many rows as that (i.e., 6,000) in the detail table, for a total of 8,000 rows.

This last analysis has a subtle built-in assumption that is usually true: Starting with a fraction "F" of rows from a master table, a join will link those rows to roughly a fraction "F" of the rows in the detail table. This assumed behavior of joins is referred to as "inheritance of filter selectivities by detail tables." Thus, a filter on headers selecting 1% of the headers should result in a join to about 1% of the lines, and 3% of the customers should join to about 3% of the orders.

Occasionally, this assumption fails, or at least the filter must be defined carefully. For example, conditions are frequently seen such as the following:

and lookups.lookup_type='RESERVE_ID'
and lookups.lookup_code=detail_table.reserve_id and it would seem that the condition on lookup_type may be a fairly selective filter (perhaps F=0.01). Yet, for purposes of estimating how many detail rows will be joined, it is essentially no filter at all—all rows in detail_table have a reserve_id pointing back to a lookup_code with that lookup_type. A better way to view this case (which also avoids the problem of failing to have a primary key on either side of the join) is to see the "filter" on lookup_type as no filter at all, but instead as part of the primary key to that table, only to be used in tandem with the rest of the key.

A corollary to the foregoing is that it is virtually always a mistake to drive to a lookup table on lookup_type alone.

A second corollary is that lookup tables should normally be listed first in the "from" clause under the rule based automatic optimizer of the database search program, because that reduces the chances that a lookup table will be selected as the driving table.

Another way to view this situation is that in essence, the lookup tables are each many virtual tables concatenated together—one virtual table per lookup_type, and the "filter" condition on type just specifies the correct, whole virtual table, filtering no rows from that virtual table.

It will be noted that every term of both costs has a common factor of 1,000,000, the assumed size of table B. Because only relative costs are of concern, the common factor can be dropped out:

A first: Cost=(0.005*3)+(0.005*3)=0.005*(3+3)=0.03= F_A*(m+m)

B first: Cost=0.002+(0.002*3)=0.002*(1+3)=0.008=F_B*(m+1)

It will also be noted that both costs have all terms multiplied by the filter-factor on the driving table, with another factor that depends on "m" and the direction of the join. Because filter factors can vary over many orders of magnitude, it is common for the selectivity of the driving filter to dominate the cost. In comparatively rare cases it will be desirable to start with a slightly-less selective filter on a smaller table to take advantage of the usually-less-important effect of "m" and join direction. (If the filter on A was better, it would be desirable to drive from A unless the filter on A was only slightly better than the filter on B.)

Simplified Query Diagrams: Using the Best Filter "F*"

Figure 4:
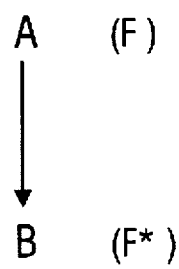

Many queries can be satisfactorily tuned without worrying about finding "m" values, or including "m" on the diagram, and even without worrying about the exact values of the filter factors, and instead simply focusing on orders of magnitude to identify quickly the best filter (flagged with "*", perhaps). This more qualitative approach would produce a diagram such as shown in FIG. 4, in which the "F*" next to table B signifies that the filter on B is the best filter. That simpler diagram and analysis is very often enough to find the best plan.

Initial Rules of Thumb

A useful rule of thumb for perhaps 90% of applications queries is to "drive" the tuning from the index on the best filter, and use (only) the index(es) on full connecting join keys to reach the other table(s) with nested loops. It has been determined empirically that this simple rule suffices to tune probably 90% of queries to within a few percent of the optimum.

The remaining 10% of the cases are more complex. The discussion above focused on the key role played by the "FROM" clause and the "WHERE" clause in query optimization. Rarely, the "SELECT", "GROUP BY" or "ORDER BY" parts of the query can have an effect. Both "GROUP BY" and "ORDER BY" clauses require that the rows be sorted, which can be an expensive operation if many rows (or groups in the case of "GROUP BY") are sorted, requiring that a temporary database object be written to disk because the rows do not fit in memory. Sometimes, a path that drives through an index that is naturally sorted in the desired order can deliver the sorted rows fastest, even though that index would not otherwise be optimum (if the sort were not needed). The index-driven sort may even be necessary to avoid running out of sort space in the TEMP tablespace. (Note, though, that a query returning over 50,000 rows, which would probably be in danger of running out of sort space, would correspond to a 1,000-page report if printed out. It might well be questioned whether a 1,000-page report was desirable at all.)

Only rarely will an index-driven sort offer much advantage over returning the full rowset for a batch job. On the other hand, it is common that the index-driven sort can find the first few rows much faster for a form that drives a sorted query and stops after the first 20 or so sorted rows are returned. For example, if a blind query is performed on a customer_name column, sorted on that same column, all the rows would need to be fetched to find the first 20 on the sorted list if the driving were not done from the index, but driving from the index, those first 20 rows can be obtained almost immediately.

Experienced users do not often run such on-line transaction processing (OLTP) queries against big rowsets because it is inefficient for them to page down through so many rows, and they are unlikely to find the rows they want early. Novices, however, may not know their data well enough to run more selective queries.

In product demonstrations, blind queries are common. The novice user, or a user in a demonstration environment is likely to either cancel the blind query after seeing the first rows fetched, or just make an arbitrary choice among the first rows, in either case never scrolling to much-lower rows. (Thus, performance of large OLTP sorted queries is sometimes more an issue of making a favorable first impression than of improving performance for the experienced user.)

Unfortunately, index-driven sorts on character fields can be problematic. Under most non-English character sets, the natural (binary) index order fails to match the character sort order for that alphabet, so under that NLS environment, the database cannot use the more-efficient index sort anyway to satisfy an "ORDER BY" condition.

Queries doing "distinct" on the "SELECT" list, and some queries having "GROUP BY" are unaffected by the number of duplicate rows found, and sometimes this is a clue that a more efficient path may exist that fetches fewer (or-no) duplicate rows (using a different, "FROM" clause and/or "WHERE" clause), with no net effect on the distinct rows actually returned.

Occasionally, queries that "SELECT" only columns from a given table that are indexed can drive strictly off the index, avoiding table lookups entirely. Avoiding the table lookup requires that no column not in the index being used is referenced anywhere in the query, including the "SELECT", "WHERE", and "ORDER BY" clauses. When table lookups are avoided at a stage of the query where many rows are fetched, the savings can be large, especially if the table is large and not well-cached. Occasionally, columns may be added to an index specifically to get these index-only plans.

Outer Joins and Other Direction-Forced Joins

A few more complexities will be discussed below before moving beyond two-way joins. Sometimes, the direction of a join is unavoidable, preventing an execution plan starting from the preferred filter. For example, an outer join forces the plan to drive "toward the (+)." While the existence of an index on a primary key can almost always be assumed, not all foreign keys have (or even should have) indexes. Consequently, joins going "upstream" on the diagram only work (using the usually-preferred nested loops plan) if that foreign key is indexed.

Figure 5:
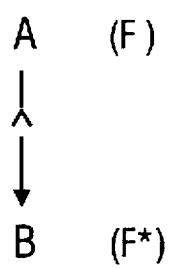
Figure 6:
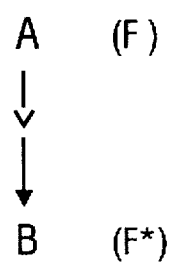

By convention, such enforced join directions will be shown with a small directional carat embedded in the join arrow. For example, if the join condition in our example is changed to "and A.fkey(+)=B.pkey," the diagram would be as shown in FIG. 5. In that case, it would probably be necessary to drive from the filter on B whether that was desirable or not. Alternatively, if the outer join was written: "and A.fkey=B.pkey(+)," or if no index on A.fkey existed, the diagram would be as shown in FIG. 6, and it would probably be necessary to drive from the filter on A even though it would be preferable to drive from the filter on B.

In the example, note that outer joins actually do not make sense—rows generated with null column values for the filter columns will just be thrown out, anyway, making the outer join equivalent in these cases to the inner join (without the "(+)"). For example, where A.fkey(+)=B.pkey and A.effective-date between :lodate and :hidate will generate artificial rows of all null values for table A wherever no matching A.fkey is found for a given B.pkey. For those rows, however, that leaves and null between :lodate and :hidate which is always false, discarding the only rows that would differ from the rows returned by the plain inner join. To make the outer join different from the inner join, the filter condition would need to be modified to something like:

and nvl(A.effective_date, :lodate) between :lodate and :hidate if necessary to get the desired rows. If throwing out the rows discarded by the original filter (making the join an inner join) is truly desirable, then it is clearly better to express the join as a regular inner join, without the "(+)," to give more freedom to find the best execution plan (and to make the user's intent more clear) since the optimizer may fail to recognize the equivalence of inner and outer joins in these special cases.)

Nested-Loops Joins

Nested-loops joins are the most common in Oracle Applications SQL. A nested-loops join of A to B is carried out by fetching rows from the driving table A and for each of these rows finding the matching row(s) in B (in a loop executed for each row in A that passes the filters on A), usually using the index on a primary or foreign key that points back at A. In the case of many-way joins, a later nested loop will join to a table X finding the matching rows in X for each row so far generated from the earlier joins (and passing all filter conditions applicable up until that point), usually through an index on a primary or foreign key pointing back to any one or more of the earlier-joined tables pointed to by that key.

Occasionally, nested loops are found that join to tables through an index that is on a filter condition or on only part of a key, or even that joins through nested loop to a full table scan. These almost always cause problems, fetching many times more rows from the joined-to table than would have been fetched by using the full join key. For example, a driving table returning just 10 rows can cause 10 full table scans if the next table is accessed by full table scan. Nested loops to anything other than a full primary or foreign key are likely to result in a Cartesian product of two potentially large rowsets.

Sort-Merge Joins

On rare occasions, sort-merge joins are a useful alternative to regular nested-loops joins. In the sort-merge join, each of the two tables being joined is accessed independently, either through a full table scan, or through an index (or two) on one-table filter condition(s). As the two independent rowsets (from each table) are accessed, those rows satisfying that table's filter conditions are sorted on the join column(s). Once both sorted rowsets are complete, they are merged in a single pass down both sets to find matches on the join column(s). Sorting of the rowsets can happen in memory if they are smaller than the sort space allocated to each process. Bigger rowsets can be written to disk in temporary objects written to the TEMP tablespace.

The biggest drawback to sort merge joins is that disk sorting is apt to be long-running and expensive in terms of load on the database writer. For very large rowsets (say, over 200,000 rows), disk sorting can simply fail because of exhaustion of sort space in the TEMP storage area.

For the sort-merge join, the method of accessing the first table (the table that would be the driving table in the best nested-loops plan) is the same, with the added cost of the sort for that rowset. Therefore, the primary advantage to the sort merge join is in a (potentially) lowered cost for the access method on the second table. Since the first table is usually accessed through the best filter available (assuming the query is optimized), and joins generally inherit the selectivity of already-applied filters, optimized nested-loops joins usually access the fewest rows.

A sort-merge should be preferred when a full table scan is better than an indexed access with the combined selectivity of filter(s) applied to earlier table(s), or the indexed filter on the table being joined is better than the combined filter(s) applied so far. In the example given, if an outer join were and A.fkey=B.pkey(+)

or if no index on A.fkey existed, it would be necessary to drive from the inferior filter on A. That would make the use of a sort merge join the only effective means of getting the advantage of the better filter for cheaper access to B. However, in the outer join case, the filter "and B.phase=1" would need to be rephrased as "and B.phase(+)=1" to be distinct from the inner join in potential rows returned, and to allow the desired merge join. It may also be necessary to use the cost-based optimizer, probably with hints as well (depending on the data distributions seen by the optimizer), to get the desired plan in this case.

In all, the conditions that justify a sort-merge join are quite selective, and not often all met, as discussed below.

Conditions Justifying a Sort-Merge Join

A sort-merge join is likely to be justified if the following three conditions exist:

1. either the driving table is forced not to be the table with the best filter (owing to lack of a foreign key index or owing to an outer join), or the table with the best set of filter conditions drives to a large enough fraction of the second table that a full table scan on the second table is preferred; and 2. the cost savings owing to the superior method of accessing the second table (see condition 1) more than pays for the costs of both rowset sorts. A disk sort (>50,000 rows?) is likely to be expensive; and 3. the user is very confident that the biggest possible rowsets for the biggest installation of the application will not result in a bigger disk sort than can fit in available space in the TEMP tablespace at that site. It is useful to remember that under the well-known Murphy's Law ("anything that can go wrong, will go wrong"), the first "Out of Sort Space" error at the biggest site will come back as a priority-1 bug that can only be fixed reliably by forcing the nested-loops join instead of the sort-merge join. The safe limit is not known with certainty; rowsets that will ever have more than 50,000 rows at the biggest site with the least-selective single-table filters for that query should ordinarily be avoided.

In the example above, note that a small rowset would normally be expected from table A because the filter "and A.effective-date between :lodate and :hidate" is usually expected to select only 1/200th of the rows from A (because ":lodate" is expected to be very close to ":hidate"), but if the date range will sometimes be large, it is desirable to arrange an execution plan that works in that worst case.

Many-Table Queries

It may sometimes seem that diagrams of this kind, and the accompanying analysis, amount to swatting flies with a pile driver, and that it may be more effective simply to try out the few possibilities for the two-way join and go with the fastest one. That indeed is not a bad approach for two-way joins.

As queries grow more complex, however, the number of possible join orders grows as n! (n-factorial), where "n" is the number of tables in the "from" clause. For example, a simple 5-way join already has 120 possible join orders. As a practical matter, therefore, a more systematic approach is essential in many cases.

To illustrate how the approach extends to more complicated queries, the tuning of the following hypothetical 8-way join, which has 8!=40,320 possible join orders, is explained below. The primary and foreign keys for most of these joins have two columns: First, the org_id column; and second, the <p/f>key<n> column:

```
select <stuff>
from
    A,
    B,
    C,
    D,
    E,
    F,
    G,
    H
where A.col1 is null
    and         nvl(A.org_id, :orgid) = :orgid
    and         A.pkey1(+) = D.fkey1
    and         D.datecol between :lodate and :hidate
    and         D.org_id = :org_id
    and         D.fkey2 = G.pkey2
    and         G.org_id = :org_id
    and         D.fkey3 = B.pkey3
    and         B.org_id = :org_id
    and         B.status = 'RARE'
    and         B.fkey4 = F.pkey4
    and         F.org_id = :org_id
    and         F.item_type = H.lookup_code
    and         H.lookup_type = 'ITEM_TYPE'
    and         H.meaning != :excluded_meaning
    and         B.fkey5 = E.pkey5
    and         E.org_id = :org_id
    and         B.fkey6 = C.pkey6
    and         C.org_id = :org_id
    and         C.region = :region
```

Examination reveals that in its current form, this query is likely to result in greatly suboptimal execution, running thousands of times longer than it needs to. Even a seemingly promising execution plan, using indexes to access every table, could be massively suboptimal for a query such as this.

Achieving a tuned execution plan requires a systematic approach. Assume it is known that indexes exist on all the foreign keys referenced except B.fkey6, which is the foreign key pointing to table C. All tables except the lookup table H have two-part primary keys, (org_id, pkey<n>), uniquely indexed in that order. (Incidentally, it is usually not a good idea to have indexes start with an unselective column like org_id.) The primary key to the lookup table H is uniquely indexed on the columns (H.lookup_type, H.lookup_code) in that order.

There are also filter indexes on D.datecol, on C.region and on (B.status, B.dateco12). Since :org_id (the first column of an index) is specified for most tables, and H.lookup_type is specified for table H, the only table that the rule based optimizer will avoid as a driving table, regardless of the order of the from clause, is table A, since the outer join for this table prevents it from driving to the rest of the tables. Of course, this gives the optimizer ample opportunity to choose the wrong plan.

The diagram for the foregoing query is shown in FIG. 7. If it is assumed that the driving process will proceed from the best filter on table B, the only "uphill multiplier" *m of interest is the one going from table B to table D, the "root detail table." (If more links existed to get from the driving table to the root detail table, uphill multipliers for each link leading from the driving table to the root detail table would be needed.)

It should be noted that in a sense, the root detail table D is the table that eventually will actually be queried: Each row returned by the query will correspond to exactly one row of table D; all the other tables are joined simply to supply further data on those rows in table D that are kept in less-detailed tables for reasons of normalization. Knowing this can aid in understanding the real purpose of the query.

Assume first that *m is high, i.e., table D has many more rows than table B. Also note that the conditions of org_id are part of the join condition for all but the driving table. Now assume a decision is made to rank the remaining filters as follows:

F3* (B.status='RARE')–*BEST tie: F4 (C.region=:region), F1 (D.datecol between :lodate and :hidate)

F2 (A.col1 is null)

F5 (H.meaning!=:excluded_meaning)–WORST

In this case, the plan is straightforward and follows the general rule for most queries:

(1) Start at the best filter;
(2) Drive downwards (usually) toward the best remaining filters first,
(3) Go up only when forced, then again go downward to the best remaining filters;
(4) Repeat until all tables are joined through full primary or foreign keys.

This rule leads unambiguously to the following join order for the example above, diagrammed in FIG. 7:

B,C,F,H,E,D,A,G

Unusual Join Orders

The main case still left for straight joints is an unusual join order. As long as the "uphill multiplier" "*m" is large, normally it is always preferable to do all downhill joins first, in the interest of avoiding an increase in the rowset with the uphill join before it is necessary. However, if "*m" is close to one (or even less than one in rare cases), it may be desirable to go uphill to find a good filter (that more than cancels the rowset increase from "*m") before completing all downhill joins. Usually, however, that would be no more than icing on the cake, so to speak: If the execution plan is appropriate up to the point where the traversal would go uphill in any event, it follows that the cost of the remaining downhill joins is low.

In the immediately preceding example, assume that *m is just over 1. It likely would be desirable to go to the filters F1 and F2 on tables D and A before joining to tables F, H, G, and E. The new optimum join order for this case would be B, C, D, A, F, H, E, G. (Alternatively, tables G and E could be switched, inasmuch as they are no more than unfiltered downhill joins that have no effect on the cost of other joins.)

Augmented Rules of Thumb

The foregoing discussion demonstrates that the rules of thumb summarized above can be augmented to read as follows:

1. Almost always drive from the table with the best combination of filters, i.e., those that select the smallest fraction of the table.

2. Occasionally, drive from another table if it also has a very good filter that uses an index, where the better combination of filters cannot use an index selectively. (For example, the better filter, which might nevertheless not be used, might be a very selective "is null" condition or a condition on an unindexed column.) Rarely, it may be necessary to drive from an inferior filter because the best filter cannot access the rest of the join tree owing to an outer join or owing to lack of an index on a foreign key. In this case, it is desirable to start as close to the best filter as possible while still having access to the rest of the tree. (In the example above, the driving would begin at table D to get to the filter on table A, and from table B to get to the filter on table C if either A or C had the best filter, because it is not possible to access the rest of the join tree from either table A or table C.)

3. Very rarely, drive from an inferior filter if it is close on the join tree to other filters that in combination are more selective than the best filter.

4. Use (only) the indexes on full connecting join keys to reach the other tables with nested loops.

5. In cases of near ties between filters, choose the driving table lower in the tree, or the smaller table, or the table closest to other good filters.

6. Go "downhill" on the join tree whenever possible, to the best remaining indexes first.

7. Rarely, ignore rule 6 to go uphill to a good filter that more than cancels the multiplication in rows owing to the one-to-many uphill join (implying *m is small, especially if it is not much more than 1).

8. When necessary, alternative plans can be compared by estimating filter selectivities and *m values, and calculating the sum-of the rowcounts fetched from all tables. Alternatively, just use real data to time the queries for reasonable alternatives, which should be very few in number.

9. Only consider sort-merge joins in the special circumstances already described.

Program Storage Device

Any of the foregoing variations may be implemented by programming a suitable general-purpose machine having appropriate hardware. The machine may comprise a single computer. Alternatively, the machine may comprise a plurality of computers connected by a communications link such as an RS-232 link or a network; the computers may be linked in, e.g., a parallel-processing arrangement or a client-server arrangement.

The programming may be accomplished through the use of a program storage device readable by the machine and encoding a program of instructions executable by the machine for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A machine-executed method of creating a data structure in a memory device, for use in selecting an execution plan for a data access statement that specifies (i) a plurality of tables and (ii) a plurality of join conditions, each of said join conditions specifying a relationship between (x) a table that uses a key as a primary key, referred to as a master table, and (y) a table that uses a corresponding key as a foreign key, referred to as a detail table, said method comprising:

(a) defining a set of nodes respectively representing the tables;

(b) defining a set of directional links between pairs of nodes each of which represents a master-detail relationship between a detail table and a corresponding master table;

(c) defining, in a memory device, a data structure, referred to as a join tree, comprising a representation of the nodes and their directional links;

(d) associating with the join tree a representation of a set of properties of the nodes and links, comprising:

(1) for each node, a set of zero or more selectivity factors, each selectivity factor indicating the expected fraction of rows in the table represented by the node that satisfy one or more logical conditions set forth in the data access statement;

(2) for each directional link associated with a detail table and a master table, (A) the ratio of (i) the number of distinct rows satisfying the join statement in the detail table A to (ii) the number of distinct rows satisfying the join statement in the master table, and (B) the probability that a row in the detail table will have a corresponding row in the master table.

2. The method of claim 1, wherein the data access statement is an SQL statement.

3. The method of claim 1, wherein the data structure comprises one or more selectivity factors, and at least one of said one or more selectivity factors is a filter.

4. A machine-executed method of creating a data structure in a memory device for use in selecting an execution plan for an SQL statement that specifies (i) a plurality of tables and (ii) a plurality of join conditions each of which specifies a relationship between (x) a table that uses a key as a primary key, referred to as a master table, and (y) a table that uses a corresponding key as a foreign key, referred to as a detail table, said method comprising:

(a) defining a set of nodes respectively representing the tables;

(b) defining a set of directional links between pairs of nodes each of which represents a master-detail relationship between a detail table and a corresponding master table;

(c) defining, in said memory device, a data structure, referred to as a join tree, comprising a representation of the nodes and their directional links;

(d) associating with the join tree a representation of a set of properties of the nodes and links, comprising:

(1) for each node, a set of zero or more filters, each filter indicating the expected fraction of rows in the table represented by the node that satisfy one or more logical conditions set forth in the SQL statement;

(2) for each directional link associated with a detail table and a master table, (A) the ratio of (i) the number of distinct rows satisfying the join statement in the detail table A to (ii) the number of distinct rows satisfying the join statement in the master table, and (B) the probability that a row in the detail table will have a corresponding row in the master table.

5. A memory device containing a data structure created in accordance with a specified one of claims 1, 2, 3, and 4.

6. A program storage device readable by the machine of a specified one of claims 1–4 and 11–15 and encoding a program of instructions that, when executed by the machine, results in the performance of the operations said forth in said specified one claim.

7. A machine-readable memory device encoding a map of a data access statement, said data access statement specifying (i) a plurality of tables and (ii) a plurality of join conditions, each of said join conditions specifying a relationship between (x) a table that uses a key as a primary key, referred to as a master table, and (y) a table that uses a corresponding key as a foreign key, referred to as a detail table, said map comprising respective representations of:

(a) a set of nodes respectively representing the tables;

(b) a set of directional links between pairs of nodes, each directional link representing a master-detail relationship between a detail table and a corresponding master table;

(c) a set of properties of the nodes and links, comprising:

(1) for each node, a set of zero or more selectivity factors, each selectivity factor indicating the expected fraction of rows in the table represented by the node that satisfy one or more logical conditions set forth in the data access statement;

(2) for each directional link associated with a detail table and a master table, (A) the ratio of (i) the number of distinct rows satisfying the join statement in the detail table A to (ii) the number of distinct rows satisfying the join statement in the master table, and (B) the probability that a row in the detail table will have a corresponding row in the master table.

8. The memory device of claim 7, wherein the data access statement is an SQL statement.

9. The memory device of claim 7, wherein the data structure comprises one or more selectivity factors, and at least one of said one or more selectivity factors is a filter.

10. A machine-readable memory device encoding a map of an SQL statement, said SQL statement specifying (i) a plurality of tables and (ii) a plurality of join conditions, each of said join conditions specifying a relationship between (x) a table that uses a key as a primary key, referred to as a master table, and (y) a table that uses a corresponding key as a foreign key, referred to as a detail table, said map comprising respective representations of:

(a) a set of nodes respectively representing the tables;

(b) a set of directional links between pairs of nodes, each directional link representing a master-detail relationship between a detail table and a corresponding master table;

(d) a set of properties of the nodes and links, comprising:

(1) for each node, a set of zero or more filters, each filter indicating the expected fraction of rows in the table represented by the node that satisfy one or more logical conditions set forth in the SQL statement;

(2) for each directional link associated with a detail table and a master table, (A) the ratio of (i) the number of distinct rows satisfying the join statement in the detail table A to (ii) the number of distinct rows satisfying the join statement in the master table, and (B) the probability that a row in the detail table will have a corresponding row in the master table.

11. A computer-executed method of generating a human-readable graphic diagram representing an input data access statement said input data access statement being encoded in a data structure in a memory device in accordance with claim 7.

12. A computer-executed method of constructing a tuned data access statement as a replacement for an input data access statement, said input data access statement being encoded in a data structure in a memory device in accordance with claim 7, said data structure comprising (i) a map representing a plurality of tables and one or more links between pairs of tables, each said link having a direction referred to as a downhill direction and an opposite direction referred to as an uphill direction, and (ii) for each of at least two of said plurality of tables, a selectivity factor respectively associated with said two tables, said method comprising:

(a) defining one selectivity factor as the best selectivity factor;

(b) inserting into the tuned data access statement a reference to the table associated with the best selectivity factor;

(c) searching downhill in the map for a best-remaining selectivity factor;

(d) if the best-remaining selectivity factor is found, then:
  (1) inserting into the tuned data access statement a reference to the table associated with the best-remaining selectivity factor, and
  (2) repeating the operations described in paragraphs (c) and (d);

(e) else searching uphill in the map for a best-remaining selectivity factor and repeating the operations described in paragraphs (c) and (d).

13. The method of claim 12, wherein the data access statement is an SQL statement.

14. The method of claim 12, wherein at least one of said one or more selectivity factors is a filter.

15. A computer-executed method of constructing a tuned SQL statement as a replacement for an input SQL statement, said input SQL statement being encoded in a data structure in a memory device in accordance with claim 10, said data structure comprising (i) a map representing a plurality of tables and one or more links between pairs of tables, each said link having a direction referred to as a downhill direction and an opposite direction referred to as an uphill direction, and (ii) for at least two of said plurality of tables, a filter respectively associated with said two tables, said method comprising:

(a) defining one filter as the best filter;

(b) inserting into the tuned SQL statement a reference to the table associated with the best filter;

(c) searching downhill in the map for a best-remaining filter;

(d) if the best-remaining filter is found, then:
  (1) inserting into the tuned SQL statement a reference to the table associated with the best-remaining filter, and
  (2) repeating the operations described in paragraphs (c) and (d);

(e) else searching uphill in the map for a best-remaining filter and repeating the operations described in paragraphs (c) and (d).

* * * * *

UNITED STATES PATENT AND TRADEMARK OFFICE
CERTIFICATE OF CORRECTION

PATENT NO. : 5,761,654
DATED : June 2, 1998
INVENTOR(S) : Daniel S. Tow

It is certified that error appears in the above-identified patent and that said Letters Patent is hereby corrected as shown below:

In Col. 20, line 11, between "operations" and "forth," please delete "said" and insert therefor --set--.

In Col. 20, line 58, please delete "(d)" and insert therefor --(c)--.

Signed and Sealed this

First Day of September, 1998

*Attest:*

BRUCE LEHMAN

*Attesting Officer*  *Commissioner of Patents and Trademarks*